(12) United States Patent
Chaffins et al.

(10) Patent No.: US 11,642,842 B2
(45) Date of Patent: May 9, 2023

(54) THREE-DIMENSIONAL PRINTING

(71) Applicant: HEWLETT-PACKARD DEVELOPMENT COMPANY, L.P., Spring, TX (US)

(72) Inventors: Sterling Chaffins, Corvallis, OR (US); Anthony P. Holden, Corvallis, OR (US); Katrina Donovan, Corvallis, OR (US); Noemie Midrez, Corvallis, OR (US); Garry Hinch, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 85 days.

(21) Appl. No.: 16/603,303

(22) PCT Filed: Jan. 26, 2018

(86) PCT No.: PCT/US2018/015489
§ 371 (c)(1),
(2) Date: Oct. 7, 2019

(87) PCT Pub. No.: WO2019/147265
PCT Pub. Date: Aug. 1, 2019

(65) Prior Publication Data
US 2021/0107216 A1 Apr. 15, 2021

(51) Int. Cl.
*B29C 64/165* (2017.01)
*B33Y 10/00* (2015.01)
(Continued)

(52) U.S. Cl.
CPC .......... *B29C 64/165* (2017.08); *B22F 10/14* (2021.01); *B29C 64/291* (2017.08); *B33Y 10/00* (2014.12);
(Continued)

(58) Field of Classification Search
CPC .......... B22F 10/10; B22F 10/14; B22F 12/13; B22F 12/63; B29C 64/165; B29C 64/291;
(Continued)

(56) References Cited

U.S. PATENT DOCUMENTS 9,434,838 B2  9/2016 Jung et al.
2004/0262803 A1* 12/2004 Neilsen .......... B29C 64/165
425/375

(Continued)

FOREIGN PATENT DOCUMENTS

CN  104150915 A  11/2014
EP  3178890 A1  6/2017
(Continued)

*Primary Examiner* — Philip C Tucker
*Assistant Examiner* — Jimmy R Smith, Jr.
(74) *Attorney, Agent, or Firm* — Dierker & Kavanaugh, P.C.

(57) ABSTRACT

In an example of a method for three-dimensional (3D) printing, a build material composition is applied to form a build material layer. The build material composition includes a polymeric or polymeric composite build material, and a precipitating agent. Based on a 3D object model, a fusing agent is selectively applied on at least a portion of the build material composition. The fusing agent includes a radiation absorber, which the precipitating agent precipitates. The build material composition is exposed to radiation to fuse the at least the portion to form a layer of a 3D part.

15 Claims, 5 Drawing Sheets

(51) Int. Cl.
*B29C 64/291* (2017.01)
*B22F 10/14* (2021.01)
*B33Y 70/10* (2020.01)
*C09D 11/101* (2014.01)
*C09D 11/102* (2014.01)
*C09D 11/38* (2014.01)
*C09D 11/54* (2014.01)
*B22F 12/13* (2021.01)
*B22F 12/63* (2021.01)

(52) U.S. Cl.
CPC ............ *B33Y 70/10* (2020.01); *C09D 11/101* (2013.01); *C09D 11/102* (2013.01); *C09D 11/38* (2013.01); *C09D 11/54* (2013.01); *B22F 12/13* (2021.01); *B22F 12/63* (2021.01)

(58) Field of Classification Search
CPC ......... B33Y 10/00; B33Y 70/00; B33Y 70/10; C04B 2235/424; C04B 2235/6026; C04B 35/00; C08G 69/26; C09D 11/101; C09D 11/102; C09D 11/38; C09D 11/54; Y02P 10/25
See application file for complete search history.

(56) References Cited

U.S. PATENT DOCUMENTS

| | | |
|---|---|---|
| 2005/0137297 A1 | 6/2005 | Wit |
| 2006/0208388 A1 | 9/2006 | Bredt et al. |
| 2007/0241482 A1 | 10/2007 | Giller et al. |
| 2018/0056596 A1* | 3/2018 | Taniuchi ............... B29C 64/295 |
| 2019/0084238 A1* | 3/2019 | Zeulner ................... B22F 10/70 |

FOREIGN PATENT DOCUMENTS

| | | |
|---|---|---|
| WO | 2015/167530 A2 | 11/2015 |
| WO | WO2016165747 A1 | 10/2016 |
| WO | WO-2016175832 A1 | 11/2016 |
| WO | 2017/069778 A1 | 4/2017 |
| WO | WO2017099478 A1 | 6/2017 |
| WO | WO2017100853 A1 | 6/2017 |
| WO | WO2017131709 A1 | 8/2017 |
| WO | WO2017146711 A1 | 8/2017 |

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
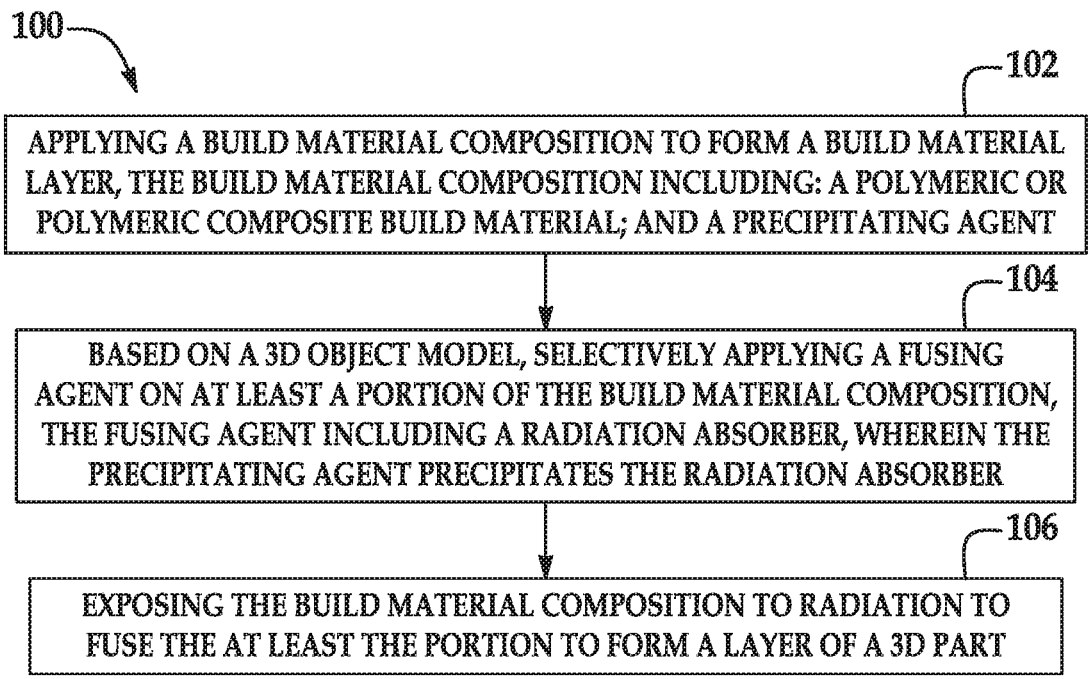
FIG. 1 is a flow diagram illustrating an example of a method for 3D printing disclosed herein.

Some examples of three-dimensional (3D) printing may utilize a fusing agent (including a radiation absorber) to pattern polymeric build material or polymeric composite build material. In these examples, an entire layer of the polymeric or polymeric composite build material is exposed to radiation, but the patterned region (which, in some instances, is less than the entire layer) of the polymeric or polymeric composite build material is fused/coalesced and hardened to become a layer of a 3D part. In the patterned region, the fusing agent is capable of at least partially penetrating into voids between the polymeric or polymeric composite build material particles, and is also capable of spreading onto the exterior surface of the polymeric or polymeric composite build material particles. This fusing agent is capable of absorbing radiation and converting the absorbed radiation to thermal energy, which in turn fuses/coalesces the polymeric or polymeric composite build material that is in contact with the fusing agent. Fusing/coalescing causes the polymeric or polymeric composite build material to join or blend to form a single entity (i.e., the layer of the 3D part). Fusing/coalescing may involve at least partial thermal merging, melting, binding, and/or some other mechanism that coalesces the polymeric or polymeric composite build material to form the layer of the 3D part.

Fusing agent components, which may include a vehicle and a radiation absorber, may be balanced so that the agent can be inkjetted and so that desirable radiation absorption efficiency is achieved. The characteristics that may contribute to good jettability may also cause the fusing agent to exhibit an undesirable wetting behavior on some polymeric or polymeric composite build materials. As an example, the fusing agent (including the radiation absorber) migrates outside of a desired fill volume. The migration of the fusing agent may be the result of the wetting properties of the build material, and the effect that these properties have on the fusing agent vehicle when it is applied thereto. To accommodate the wetting properties of the build material (e.g., when the build material is hydrophilic), the vehicle could be altered to increase its viscosity or its hydrophobicity, however, such alterations could lead to poor or non-jettability.

The migration of the fusing agent may cause the polymeric or polymeric composite build material outside of the desired fill volume to fuse/coalesce, due to the presence of the radiation absorber outside of the desired fill volume. Fusing/coalescing outside of the desired fill volume may deleteriously affect the surface finish quality and/or accuracy of the 3D part. For example, the surface may be undesirably rough and/or may have an undesirable appearance. As another example, the 3D part may be larger than intended. The migration of the fusing agent may also cause the polymeric or polymeric composite build material in the desired fill volume to under fuse/coalesce due to the loss (through migration) of some of the radiation absorber. Under fusing/coalescing the polymeric or polymeric composite build material in the desired fill volume may reduce the mechanical tolerance(s) and mechanical strength of the 3D part.

Disclosed herein is a build material composition including a precipitating agent. The precipitating agent precipitates the radiation absorber out of the fusing agent when the fusing agent comes into contact with the precipitating agent. The precipitated radiation absorber may be contained in the voids among the build material particles within the desired fill volume, while the vehicle of the fusing agent may migrate outside of the desired fill volume. As such, the precipitating agent may prevent the radiation absorber from moving beyond the desired fill volume, which may allow for the production of a 3D part with improved surface finish quality, accuracy, mechanical tolerance, and/or mechanical strength (as compared to a 3D part printed according to a comparable method for 3D printing but without using the precipitating agent). As used herein, the term "desired fill volume" refers to the volume of build material that corresponds to a portion of a 3D object model (i.e., in the digital domain) of the 3D part.

In the examples disclosed herein, the build material composition includes a polymeric or polymeric composite build material and the precipitating agent. In some examples, the build material composition may include additional components, such as an additive and/or an antioxidant, a brightener, a charging agent, a flow aid, or a combination thereof. In other examples, the build material composition consists of the polymeric or polymeric composite build material and the precipitating agent. In these examples, the build material composition does not include any additional components.

In one example, the build material composition for three-dimensional (3D) printing comprises: the polymeric or polymeric composite build material; and the precipitating agent selected from the group consisting of a water-soluble mono-valent metallic salt, a water-soluble multi-valent metallic salt, an organic salt, and combinations thereof. In another example, the build material composition for three-dimensional (3D) printing comprises: the polymeric or polymeric composite build material; and the precipitating agent selected from the group consisting of a water-soluble mono-valent metallic salt, a water-soluble multi-valent metallic salt, an organic acid having an average particle size ranging from about 10 nm to about 100 nm, an organic salt, and combinations thereof. In still another example, the build material composition for three-dimensional (3D) printing comprises: the polymeric or polymeric composite build material; the precipitating agent selected from the group consisting of a water-soluble mono-valent metallic salt, a water-soluble multi-valent metallic salt, an organic salt, and combinations thereof; and an additive selected from the group consisting of a guanidine compound, an alkenyl succinic anhydride, an alkyl ketene dimer, and a combination thereof.

The polymeric or polymeric composite build material may be a polymeric build material or a polymeric composite build material. As used herein, the term "polymeric build material" may refer to crystalline or semi-crystalline polymer. As used herein, the term "polymeric composite build material" may refer to composite material made up of polymer and ceramic.

Examples of semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other examples of crystalline or semi-crystalline polymers suitable for use as the polymeric build material include polyethylene, polypropylene, and polyoxomethylene (i.e., polyacetals). Still other examples of suitable polymeric build materials include polystyrene, polycarbonate, polyester, polyurethanes, other engineering plastics, and blends of any two or more of the polymers listed herein.

Any of the previously listed crystalline or semi-crystalline polymers may be combined with ceramic material to form the polymeric composite build material. Examples of suitable ceramic material include metal oxides, inorganic glasses, carbides, nitrides, and borides. Some specific examples include alumina ($Al_2O_3$), glass, silicon mononitride (SiN), silicon dioxide ($SiO_2$), zirconia ($ZrO_2$), titanium dioxide ($TiO_2$), or combinations thereof. The amount of ceramic material that may be combined with the crystalline or semi-crystalline polymer may depend on the materials used and the 3D part to be formed. In one example, the ceramic material may be present in an amount ranging from about 1 wt % to about 40 wt % based on the total weight of the polymeric composite build material.

In some examples, the polymeric or polymeric composite build material may be in the form of a powder. In other examples, the polymeric or polymeric composite build material may be in the form of a powder-like material, which includes, for example, short fibers having a length that is greater than its width. In some examples, the powder may be formed from, or may include, short fibers that may, for example, have been cut into short lengths from long strands or threads of material.

The polymeric or polymeric composite build material may have a melting point or softening point ranging from about 50° C. to about 400° C. Depending upon the composition of the composite, the melting or softening point may be higher or lower. As an example, the polymeric or polymeric composite build material may be a polyamide having a melting point of about 180° C.

The polymeric or polymeric composite build material may be made up of similarly sized particles or differently sized particles. In an example, the average particle size of the polymeric or polymeric composite build material ranges from about 2 µm to about 200 µm. In another example, the average particle size of the polymeric or polymeric composite build material ranges from about 20 µm to about 90 µm. In still another example, the average particle size of the polymeric or polymeric composite build material is about 60 µm. The term "particle size", as used herein, refers to the diameter of a spherical particle, or the average diameter of a non-spherical particle (i.e., the average of multiple diameters across the particle), or the volume-weighted mean diameter of a particle distribution.

The build material composition also includes the precipitating agent. The precipitating agent may be any agent that i) is capable of precipitating the radiation absorber, and ii) does not react with the polymeric or polymeric composite build material. The precipitating agent may also be selected so that it does not interfere with or degrade the flow properties of the build material and/or so that it does not interfere with the mechanical properties of the 3D part that is formed. In some examples, the precipitating agent is disposed on surfaces of the polymeric or polymeric composite build material, disposed in voids between the polymeric or polymeric composite build material, or a combination thereof.

In some examples, the precipitating agent is selected from the group consisting of a water-soluble mono-valent metallic salt, a water-soluble multi-valent metallic salt, an organic acid, an organic salt, and a combination thereof. It has been found that the listed agents i) are capable of precipitating the radiation absorber, and ii) do not react with the polymeric or polymeric composite build material. Further, it has been found that the listed agents do not interfere with or degrade the flow properties of the build material and do not interfere with the mechanical properties of the 3D part that is formed.

In some examples, the precipitating agent includes a water-soluble mono-valent metallic salt, a water-soluble multi-valent metallic salt, or a combination thereof. In these examples, the precipitating agent may include a cation of a metal selected from the group consisting of Group I metals, Group II metals, Group III metals, transition metals, and combinations thereof. Some examples of the cation include sodium, calcium, copper, nickel, magnesium, zinc, barium, iron, aluminum, and chromium, and combinations thereof. In other examples, the precipitating agent is a water-soluble multi-valent metallic salt. In these examples, the precipitating agent may include a cation of a metal selected from the group consisting of Group II metals, Group III metals, transition metals, and combinations thereof. An example of the water-soluble multi-valent metallic salt, the precipitating agent is a divalent metallic salt. In these examples, the precipitating agent may include a cation of a Group II metal, such as calcium, magnesium, barium, etc.

When the precipitating agent includes the water-soluble mono-valent metallic salt, and/or the water-soluble multi-valent metallic salt (e.g., a divalent metallic salt), the precipitating agent may include an anion from a mineral or inorganic acid. As examples, the anion may be selected from the group consisting of chloride, iodide, bromide, nitrate, sulfate, sulfite, phosphate, chlorate, sulfonate, ortho-phosphate, and combinations thereof.

In some examples, the water-soluble mono-valent metallic salt, and/or the water-soluble multi-valent metallic salt (e.g., a divalent metallic salt), is a metallic salt of a strong inorganic acid (e.g., an acid having a $pK_a$, logarithmic acid dissociation constant, value less than −1.74). In these examples, the precipitating agent may include an anion selected from the group consisting of chloride, iodide, bromide, sulfate, perchlorate, and combinations thereof. As specific examples, the salt may be a metallic salt of the following strong inorganic acids: perchloric acid ($HClO_4$), hydroiodic acid (HI), hydrobromic acid (HBr), hydrochloric acid (HCl), and sulfuric acid ($H_2SO_4$). In other examples, the water-soluble mono-valent metallic salt, and/or the water-soluble multi-valent metallic salt (e.g., a divalent metallic salt), is a metallic salt of a weak inorganic acid (e.g., an acid having a $pK_a$, logarithmic acid dissociation constant, value greater than or equal to −1.74). In these examples, the precipitating agent may include an anion selected from the group consisting of nitrate, chlorate, ortho-phosphate, and combinations thereof. As specific examples, the salt may be a metallic salt of the following weak inorganic acids: nitric acid ($HNO_3$) and chloric acid ($HClO_3$).

Some examples of the water-soluble metallic salt precipitating agents include calcium chloride, magnesium chloride, barium chloride, calcium bromide, magnesium bromide, calcium nitrate, magnesium nitrate, barium nitrate, and combinations thereof. In an example, the precipitating agent is calcium chloride ($CaCl_2$), magnesium chloride ($MgCl_2$), or a combination thereof.

When the precipitating agent includes the water-soluble mono-valent metallic salt and/or the water-soluble multi-valent metallic salt (e.g., a divalent metallic salt), the precipitating agent may be selected so that the relative weight of the cation is maximized with respect to the anion. In other words, the precipitating agent may be selected so that the anion accounts for as little of the total weight of the metallic salt as possible. It may be desirable for the weight of the cation to be maximized with respect to the anion because the cation precipitates the radiation absorber. As such, maximizing the cation weight can enhance the precipitating efficiency based on the total weight of the salt included. As such, in an example, calcium chloride may be selected over calcium bromide.

When the precipitating agent includes the water-soluble mono-valent metallic salt and/or the water-soluble multi-valent metallic salt (e.g., a divalent metallic salt), the precipitating agent is water-soluble. In an example, this precipitating agent is water-soluble at a pH value ranging from 7 to about 10. In some examples, this precipitating agent may have a solubility in water greater than or equal to 20 grams per 100 mL of water at 20° C. and 1 atm pressure. In some other examples, this precipitating agent may have a solubility in water greater than or equal to 50 grams per 100 mL of water at 20° C. and 1 atm pressure.

In some examples, the precipitating agent includes an organic acid. Some examples of the organic acid include propionic acid, formic acid, lactic acid, carboxylic acids, lactones, oxalic acid, uric acid, polyacrylic acid, acetic acid, glycolic acid, malonic acid, malic acid, maleic acid, ascorbic acid, succinic acid, glutaric acid, fumaric acid, citric acid, tartaric acid, p-toluenesulfonic acid, methanesulfonic acid, derivatives thereof, and combinations thereof.

When the precipitating agent includes the organic acid, the precipitating agent may be able to precipitate the radiation absorber (when the fusing agent is applied on the build material composition) by lowering the pH differential that renders the radiation absorber insoluble. A pH change can destabilize the radiation absorber, causing the precipitation. The organic acid can lower the pH value of the fusing agent by an amount ranging from 1 unit (e.g., lowering the pH value from 8 to 7) to 3 units (e.g., lowering the pH value from 8 to 5). Without the organic acid, the pH of the fusing agent may drop 1 to 3 pH units when deposited on the build material, however, the pH generally has to drop 4 or 5 pH units in order to achieve the desired precipitation. As such, the presence of the organic acid in the build material composition reduces the pH differential, enabling the radiation absorber to precipitate from the fusing agent when in contact with the organic acid.

In some examples, the precipitating agent includes an organic salt. The organic salt may or may not be water-soluble. When the organic salt is not water-soluble, it may be soluble in organic solvents. Some examples of the organic salt include monosodium glutamate, bis(trimethylsilyl) malonate, magnesium propionate, magnesium citrate, calcium acetate, magnesium acetate, barium acetate, etc. When the organic salt is water-soluble, the precipitating agent may have a solubility in water greater than or equal to 5 grams per 100 mL of water at 20° C. and 1 atm pressure. In an example, the precipitating agent includes the organic salt and has a solubility in water ranging from about 5 grams per 100 mL of water at 20° C. and 1 atm pressure to about 20 grams per 100 mL of water at 20° C. and 1 atm pressure. In another example, the precipitating agent includes the organic salt and has a solubility in an organic solvent ranging from about 5 grams per 100 grams of solvent at 20° C. and 1 atm pressure to about 20 grams per 100 grams of solvent at 20° C. and 1 atm pressure. As specific examples, sodium acetate has a solubility of 16 g/100 g methanol and a solubility of 6.8 g/100 g ethanol; and citric acid has a solubility of 62 g/100 g ethanol, a solubility of 4.41 g/100 g amyl acetate, and a solubility of 35.9 g/100 g 1,4-dioxane.

As mentioned above, the precipitating agent crashes or precipitates the radiation absorber when the fusing agent is applied on the build material composition. As such, the precipitating agent may prevent the radiation absorber from penetrating beyond the desired fill volume of the build material composition. In some examples (e.g., when the precipitating agent includes the water-soluble mono-valent metallic salt, the water-soluble multi-valent metallic salt, or the organic salt), the precipitating agent may dissolve in a liquid component of the fusing agent (e.g., water or an organic solvent) and mix with the radiation absorber. In these examples, the precipitating agent may then interact with the radiation absorber and cause it to precipitate. In some other examples (e.g., when the precipitating agent includes the organic acid), the precipitating agent may dissolve or disperse in a liquid component of the fusing agent and may alter (e.g., lower) the pH of the fusing agent, which may destabilize the radiation absorber and cause it to precipitate.

The liquid component of the fusing agent that dissolves the precipitating agent will depend, in part, upon the composition of the fusing agent and the printing conditions. With aqueous based fusing agents, certain printing temperatures may evaporate the water from the fusing agent immediately upon reaching the build material. In these examples, the composition of the fusing agent that penetrates the build material is not the same as the composition of the fusing agent that was dispensed on the build material. In these instances, it may be desirable for the precipitating agent to be soluble in the organic co-solvent, rather than the water, of the fusing agent. Similarly, when the fusing agent is an organic based liquid dispensed via piezoelectric printheads, it may be desirable for the precipitating agent to be soluble in the organic solvent in the fusing agent.

The precipitating agent may be included in the build material composition is an amount sufficient to achieve the desired amount of precipitation of the radiation absorber. If not enough of the precipitating agent is included, the radiation absorber (when applied via the fusing agent) may penetrate into the build material composition beyond the desired fill volume. If too much of the precipitating agent is included, the radiation absorber (when applied via the fusing agent) may not penetrate all or substantially all of the desired fill volume. Additionally, too much of the precipitating agent may increase the cost of the build material composition and/or deleteriously affect the properties (e.g., mechanical strength) of a 3D part printed using the build material composition.

In an example, the precipitating agent includes the water-soluble mono-valent metallic salt or the water-soluble multi-valent metallic salt, and the precipitating agent is present in the build material composition in an amount ranging from greater than 0 wt % to about 10 wt %, based on the total weight of the build material composition. In another example, the precipitating agent includes the water-soluble mono-valent metallic salt or the water-soluble multi-valent metallic salt, and the precipitating agent is present in the build material composition in an amount ranging from about 0.2 wt % to about 0.5 wt %, based on the total weight of the build material composition. In still another example, the precipitating agent includes the organic acid, and the precipitating agent is present in the build material composition in an amount ranging from about 0.25 wt % to about 20 wt %, based on the total weight of the build material composition. In yet another example, the precipitating agent includes the organic salt, and the precipitating agent is present in the build material composition in an amount ranging from about 0.25 wt % to about 20 wt %, based on the total weight of the build material composition.

In an example, the precipitating agent has an average particle size ranging from about 10 nm to about 50 µm. In another example, the precipitating agent has an average particle size ranging from about 10 nm to about 100 nm. In some of these examples, the precipitating agent may form agglomerates and the average particle size of the precipitating agent (e.g., from about 10 nm to about 50 µm, or from about 10 nm to about 100 nm) may be the average particle size of the agglomerates.

In some examples, the precipitating agent includes the water-soluble mono-valent metallic salt or the water-soluble multi-valent metallic salt or the organic salt, and the build material composition further comprises an additive selected from the group consisting of a guanidine compound, an alkenyl succinic anhydride, an alkyl ketene dimer, a nitrogen containing compound, and a combination thereof. In some other examples, the precipitating agent includes the water-soluble mono-valent metallic salt or the water-soluble multi-valent metallic salt, and the build material composition further comprises an additive selected from the group consisting of a guanidine compound, an alkenyl succinic anhydride, an alkyl ketene dimer, and a combination thereof. These additives may aid the selected salt in precipitating the radiation absorber. In some examples, the additive may aid the selected salt in precipitating the radiation absorber by attracting water. By attracting water, the additive may reduce the spreading of the fusing agent. The additive may also provide other desired effects. For example, the guanidine compound may also act as a biocide.

In some examples, the additive has a melting temperature that is at least 180° C. In other examples, the additive has a melting temperature that is at least 220° C. It may be desirable for the additive to have a melting temperature within these ranges so that the additive does not melt when the build material composition is applied. In still other examples, the additive has a melting temperature that is greater than or equal to the melting temperature of the polymeric or polymeric composite build material (e.g., a temperature ranging from about 50° C. to about 400° C.). It may be desirable for the additive to have a melting temperature that is greater than or equal to the melting temperature of the polymeric or polymeric composite build material so that the additive does not melt before the polymeric or polymeric composite build material, which may allow the additive to flow within the build material layer and become unevenly distributed. Further, the additive may be selected to be thermally stable (i.e., will not decompose) at the 3D printing temperatures.

In some examples, the additive includes a guanidine compound. The guanidine compound may be a monomer, a homopolymer, or a copolymer, where the guanidine compound includes one or more monomer units having a chemical structure of:

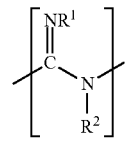

or a salt thereof, where $R^1$ is hydrogen or a lower alkyl (i.e., the number of carbons ranging from 1 to 20) and $R^2$ is hydrogen, an alkyl, an alkoxy, or a hydroxyl-substituted alkoxy. In some examples, $R^1$ is hydrogen and $R^2$ is hydrogen. In one of these examples, guanidine compound is guanidine hydrochloride

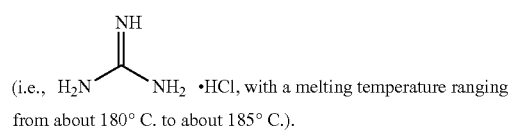

(i.e., $H_2N-C(=NH)-NH_2$ ·HCl, with a melting temperature ranging from about 180° C. to about 185° C.).

In some examples, the additive includes an alkenyl succinic anhydride. Examples of the alkenyl succinic anhydride include n-dodecenyl succinic anhydride, n-octenyl succinic anhydride

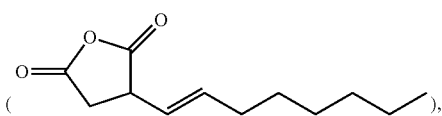

nonenyl succinic anhydride, tetrapropenyl succinic anhydride, etc.

In some examples, the additive includes an alkyl ketene dimer. Examples of the alkyl ketene dimer may have a chemical structure of:

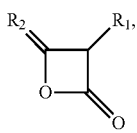

where $R_1$ is a $C_{12}$-$C_{16}$ alkyl and $R_2$ is a $C_{13}$-$C_{17}$ alkylidene. In one example, the alkyl ketene dimer is derived from palmitic acid ($C_{16}H_{32}O_2$) and has the chemical structure of:

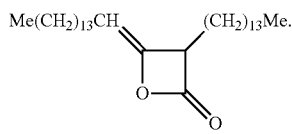

In some examples, the additive includes a nitrogen containing compound. Examples of suitable nitrogen containing compounds include compounds (e.g., oligomers or polymers) containing one or more quaternary ammonium functional groups. Examples of such functional groups may include substituted and unsubstituted amines, imines, amides, urethanes, quaternary ammonium groups, dicyandiamides, guanides, and the like. Some examples of the nitrogen containing compound include polyamines, polyethyleneimines, copolymers of diallyldimethyl ammonium chloride (DADMAC), copolymers of vinyl pyrrolidone (VP) with quaternized diethylaminoethylmethacrylate (DEAMEMA), polyam ides, cationic polyurethane latex, cationic polyvinyl alcohol, polyalkylamine dicyandiamid copolymers, amine glycidyl addition polymers, polyoxyethylene (dimethyliminio)ethylene (dimethyliminio)-ethylene dichlorides, and polymeric biguanides (e.g., polyhexamethylenebiguanide).

The nitrogen containing compound may have a low or medium molecular weight. In an example, the nitrogen containing compound has a number average ($M_N$) molecular weight equal to or less than 100,000. In another example, the nitrogen containing compound has a number average molecular weight equal to or less than about 50,000. In still another example, the nitrogen containing compound has a number average molecular weight ranging from about 10,000 to about 50,000. Examples of the nitrogen containing compounds that may have a low or medium molecular weight include polyalkylamine dicyandiamide copolymers, polyoxyethylene (dimethyliminio) ethylene, polyoxyethylene (dimethyliminio)ethylene (dimethyliminio)-ethylene dichloride, dimethyliminioethylene dichlorides, and polymeric biguanides (e.g., polyhexamethylenebiguanide).

In some examples, the additive is present in the build material composition in an amount ranging from about 0.05 wt % to about 0.7 wt %, based on the total weight of the build material composition. In an example, the additive includes the guanidine compound, and the additive is present in the build material composition in an amount ranging from about 0.05 wt % to about 0.5 wt %, based on the total weight of the build material composition. In another example, the additive includes the alkenyl succinic anhydride, and the additive is present in the build material composition in an amount ranging from about 0.05 wt % to about 0.20 wt %, based on the total weight of the build material composition. In still another example, the additive includes the alkyl ketene dimer, and the additive is present in the build material composition in an amount ranging from about 0.10 wt % to about 0.50 wt %, based on the total weight of the build material composition. In yet another example, the additive includes the alkenyl succinic anhydride and the alkyl ketene dimer, and the additive is present in the build material composition in an amount ranging from about 0.15 wt % to about 0.70 wt %, based on the total weight of the build material composition. In yet another example, the additive includes the nitrogen containing compound, and the additive is present in the build material composition in an amount ranging from about 0.05 wt % to about 0.5 wt %, based on the total weight of the build material composition.

As mentioned above, in some examples, the build material composition, in addition to the polymeric or polymeric composite build material and the precipitating agent (and in some cases the additive), may include an antioxidant, a brightener, a charging agent, a flow aid, or a combination thereof. While several examples of these components are provided, it is to be understood that these components are selected to be thermally stable (i.e., will not decompose) at the 3D printing temperatures.

Antioxidant(s) may be added to the build material composition to prevent or slow molecular weight decreases of the polymeric or polymeric composite build material and/or may prevent or slow discoloration (e.g., yellowing) of the polymeric or polymeric composite build material by preventing or slowing oxidation of the polymeric or polymeric composite build material. In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). In an example, the antioxidant may be included in the build material composition in an amount ranging from about 0.01 wt % to about 5 wt %, based on the total weight of the build material composition.

Brightener(s) may be added to the build material composition to improve visibility. Examples of suitable brighteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), and combinations thereof. In some examples, a stilbene derivative may be used as the brightener. In these examples, the temperature(s) of the 3D printing process may be selected so that the stilbene derivative remains stable (i.e., the 3D printing temperature does not thermally decompose the stilbene derivative). In an example, the brightener may be included in the build material composition in an amount ranging from about 0.01 wt % to about 10 wt %, based on the total weight of the build material composition.

Charging agent(s) may be added to the build material composition to suppress tribocharging. Examples of suitable charging agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt %, based upon the total weight of the build material composition.

Flow aid(s) may be added to improve the coating flowability of the build material composition. Flow aids may be particularly beneficial when the polymeric or polymeric composite build material has an average particle size less than 25 µm. The flow aid improves the flowability of the polymeric or polymeric composite build material by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt %, based upon the total weight of the build material composition.

Also disclosed herein is a method of forming a build material composition for 3D printing. The method includes mixing the polymeric or polymeric composite build material with the precipitating agent. One example of the method comprises: mixing a polymeric or polymeric composite build material with a precipitating agent selected from the group consisting of water-soluble mono-valent metallic salts, water-soluble multi-valent metallic salts, an organic salt, and combinations thereof.

The mixing may be accomplished by any suitable means. For example, the polymeric or polymeric composite build material may be mixed with the precipitating agent using a mixer (e.g., an industrial paddle mixer, an industrial high shear mixer, a resonant acoustic mixer, jet mills, etc.). The mixer may also be a mixer mill, such as a ball mill, powder mill, etc. Some mixers, such as jet mills, may be used for both mixing and particle size reduction.

When the build material composition includes the additive, the method may include mixing the additive with the polymeric or polymeric composite build material and the precipitating agent. When the build material composition includes the antioxidant, the brightener, the charging agent, the flow aid, or a combination thereof, the method may include mixing the antioxidant, the brightener, the charging agent, the flow aid, or a combination thereof with the polymeric or polymeric composite build material and the precipitating agent or the polymeric or polymeric composite build material may be obtained (e.g., purchased) with the antioxidant, the brightener, the charging agent, the flow aid, or a combination thereof mixed therein.

In the examples disclosed herein, it is to be understood that the mixing may be performed in a printer, or in a separate powder management station. As examples, mixing in the printer may take place on a build area platform 12, in a build material supply 14, or in a separate mixing station. In some examples, the separate printing station may be set up to deliver the mixed build material composition to the supply and/or platform.

Referring now to FIG. 1 and FIGS. 2A through 2E, an example of a method 100, 200 for 3D printing is depicted. Prior to execution of the method 100, 200 or as part of the method 100, 200, a controller 30 (see, e.g., FIG. 3) may access data stored in a data store 32 (see, e.g., FIG. 3) pertaining to a 3D part that is to be printed. The controller 30 may determine the number of layers of the build material composition 16 that are to be formed and the locations at which the fusing agent 26 from the applicator 24 is to be deposited on each of the respective layers.

Briefly, the method 100 for three-dimensional (3D) printing comprises: applying a build material composition 16 to form a build material layer 38, the build material composition 16 including: a polymeric or polymeric composite build material; and a precipitating agent (reference numeral 102); based on a 3D object model, selectively applying a fusing agent 26 on at least a portion 40 of the build material composition 16, the fusing agent 26 including a radiation absorber, wherein the precipitating agent precipitates the radiation absorber (reference numeral 104); and exposing the build material composition 16 to radiation 44 to fuse the at least the portion 40 to form a layer 46 of a 3D part (reference numeral 106).

While not shown, the method 100, 200 may include forming the build material composition 16. In an example, the build material composition 16 is formed prior to applying the build material composition 16. The build material composition 16 may be formed in accordance with the method described above. To briefly reiterate from above, the build material composition 16 may be formed by mixing the polymeric or polymeric composite build material with the precipitating agent, and in some examples, the additive. The polymeric or polymeric composite build material, the precipitating agent, and the additive may each be as described above. In this example of the method 100, 200, the build material composition 16 may also include the antioxidant, the brightener, the charging agent, the flow aid, or combinations thereof.

Figure 2A:
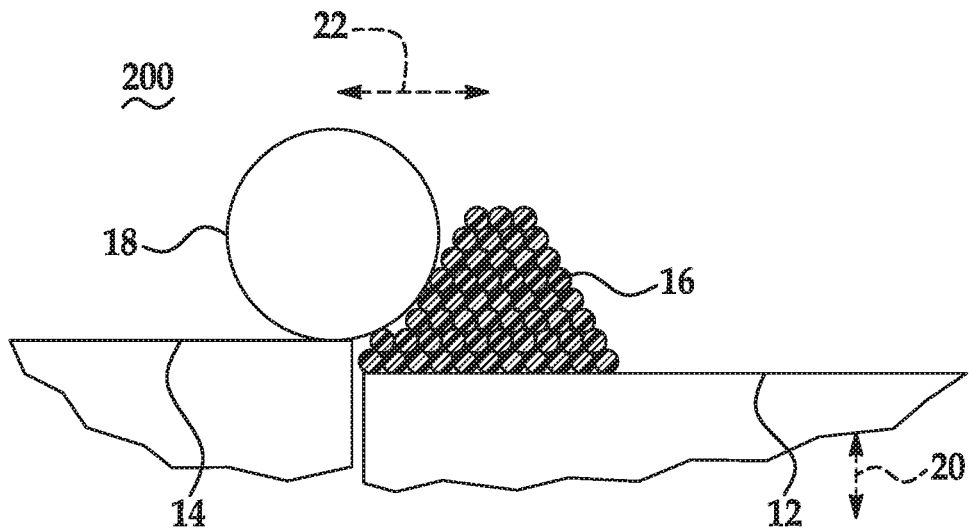
FIGS. 2A through 2E are schematic and partially cross-sectional cutaway views depicting the formation of a 3D part using an example of a method for 3D printing disclosed herein.
Figure 2B:
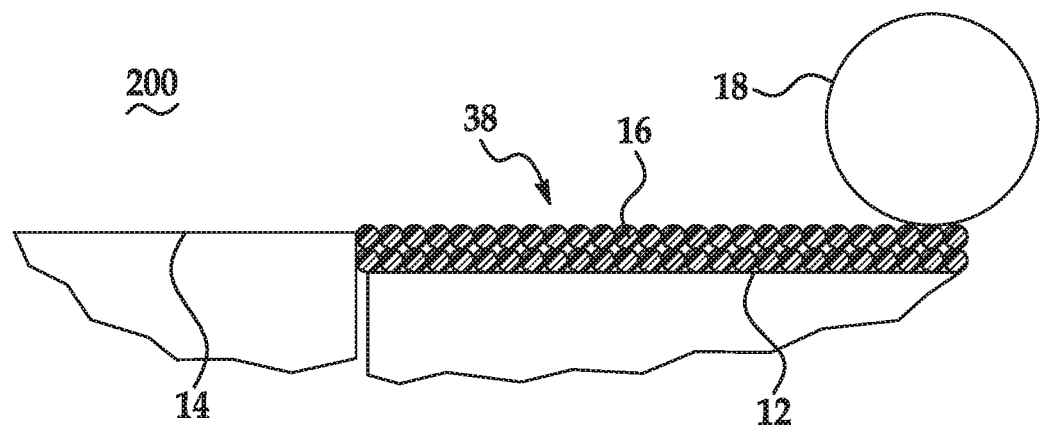

As shown at reference numeral 102 in FIG. 1 and in FIGS. 2A and 2B, the method 100, 200, includes applying the build material composition 16 to form the build material layer 38. As mentioned above, the build material composition 16 includes at least the polymeric or polymeric composite build material and the precipitating agent, and may additionally include the additive, the antioxidant, the brightener, the charging agent, the flow aid, or combinations thereof.

In the example shown in FIGS. 2A and 2B, a printing system (e.g., printing system 10 shown in FIG. 3) may be used to apply the build material composition 16. The printing system 10 may include a build area platform 12, a build material supply 14 containing the build material composition 16, and a build material distributor 18.

The build area platform 12 receives the build material composition 16 from the build material supply 14. The build area platform 12 may be moved in the directions as denoted by the arrow 20, e.g., along the z-axis, so that the build material composition 16 may be delivered to the build area platform 12 or to a previously formed layer 46. In an example, when the build material composition 16 is to be delivered, the build area platform 12 may be programmed to advance (e.g., downward) enough so that the build material distributor 18 can push the build material composition 16 onto the build area platform 12 to form a substantially uniform layer 38 of the build material composition 16 thereon. The build area platform 12 may also be returned to its original position, for example, when a new part is to be built.

The build material supply 14 may be a container, bed, or other surface that is to position the build material composition between the build material distributor 18 and the build area platform 12.

The build material distributor 18 may be moved in the directions as denoted by the arrow 22, e.g., along the y-axis, over the build material supply 14 and across the build area platform 12 to spread the layer 38 of the build material composition 16 over the build area platform 12. The build material distributor 18 may also be returned to a position adjacent to the build material supply 14 following the spreading of the build material composition 16. The build material distributor 18 may be a blade (e.g., a doctor blade), a roller, a combination of a roller and a blade, and/or any other device capable of spreading the build material composition 16 over the build area platform 12. For instance, the build material distributor 18 may be a counter-rotating roller. In some examples, the build material supply 14 or a portion of the build material supply 14 may translate along with the build material distributor 18 such that build material composition 16 is delivered continuously to the material distributor 18 rather than being supplied from a single location at the side of the printing system 10 as depicted in FIG. 2A.

As shown in FIG. 2A, the build material supply 14 may supply the build material composition 16 into a position so that it is ready to be spread onto the build area platform 12. The build material distributor 18 may spread the supplied build material composition 16 onto the build area platform 12. The controller 30 may process control build material supply data, and in response control the build material supply 14 to appropriately position the build material particles 16, and may process control spreader data, and in response, control the build material distributor 18 to spread the supplied build material composition 16 over the build area platform 12 to form the layer 38 of build material composition 16 thereon. As shown in FIG. 2B, one build material layer 38 has been formed.

The layer 38 of the build material composition 16 has a substantially uniform thickness across the build area platform 12. In an example, the thickness of the build material layer 38 is about 100 µm. In another example, the thickness of the build material layer 38 ranges from about 30 µm to about 300 µm, although thinner or thicker layers may also be used. For example, the thickness of the build material layer 38 may range from about 20 µm to about 500 µm, or from about 50 µm to about 80 µm. The layer thickness may be about 2× (i.e., 2 times) the particle diameter (as shown in FIG. 2B) at a minimum for finer part definition. In some examples, the layer thickness may be about 1.2× the particle diameter.

While the precipitating agent has been described herein as part of the build material composition 16 when the build material composition 16 is applied to form the build material layer 38, in some examples, the precipitating agent may be selectively applied to at least a portion 40 of the build material layer 38 to form the build material composition 16 in the at least the portion 40. In these examples a precipitating agent supply (not shown) may selectively deliver the precipitating agent to the portion 40 that is to have the fusing agent 26 applied thereto. The precipitating agent may be delivered as a dry particulate or via a liquid vehicle in which the precipitating agent is dispersed or dissolved. When a liquid vehicle is used to deliver the precipitating agent to the portion 40, the selective application of the precipitating may be as the selective application of the fusing agent 26 is described below. Additionally, the liquid vehicle may be any formulation of the FA vehicle described below in reference to the fusing agent 26. It is to be understood that the formulation of the liquid vehicle used to deliver the precipitating agent may depend, in part, on the precipitating agent used, the applicator to be used to apply the precipitating agent, etc.

After the build material composition 16 has been applied, and prior to further processing, the build material layer 38 may be exposed to heating. Heating may be performed to pre-heat the build material composition 16, and thus the heating temperature may be below the melting point or softening point of the build material composition 16. As such, the temperature selected will depend upon the build material composition 16 that is used. As examples, the pre-heating temperature may be from about 5° C. to about 50° C. below the melting point or softening point of the polymeric or polymeric composite build material. In an example, the pre-heating temperature ranges from about 50° C. to about 250° C. In another example, the pre-heating temperature ranges from about 150° C. to about 170° C.

Pre-heating the layer 38 of the build material composition 16 may be accomplished by using any suitable heat source that exposes all of the build material composition 16 on the build area platform 12 to the heat. Examples of the heat source include a thermal heat source (e.g., a heater (not shown) integrated into the build are platform 12 (which may include sidewalls)) or the radiation source 34, 34' (see, e.g., FIG. 3).

Figure 2C:
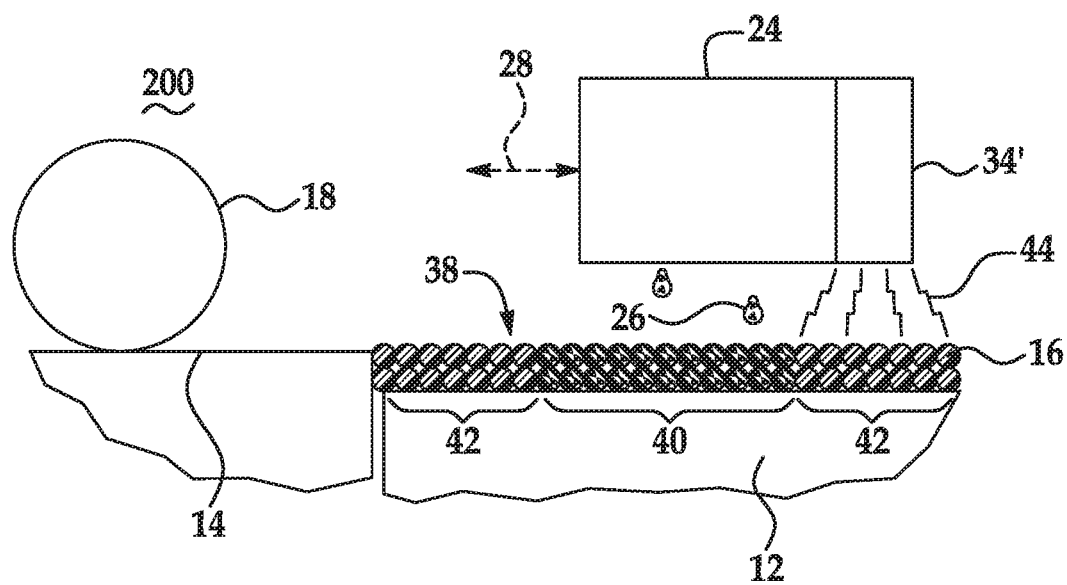

As shown at reference numeral 104 in FIG. 1 and in FIG. 2C, the method 100, 200 continues by, based on a 3D object model, selectively applying the fusing agent 26 on at least a portion 40 of the build material composition 16. The fusing agent 26 includes the radiation absorber.

When the fusing agent 26 is selectively applied, the precipitating agent in the build material composition 16 precipitates the radiation absorber. In some examples, the precipitating agent dissolves in a liquid component of the fusing agent 26 prior to precipitating the radiation absorber. In some of these examples (e.g., when the precipitating agent includes the water-soluble mono-valent metallic salt, the water-soluble multi-valent metallic salt, or the organic salt), once dissolved, the precipitating agent mixes with the radiation absorber and interacts with the radiation absorber, which causes the radiation absorber to precipitate. In some other of these examples (e.g., when the precipitating agent includes the organic acid), once dissolved, the precipitating agent alters the pH of the fusing agent 26, which destabilizes the radiation absorber and causes it to precipitate. The precipitated radiation absorber solids are contained within voids among the polymer or polymer composite build material particles in the desired fill volume. As such, the precipitating agent prevents the radiation absorber from penetrating beyond a fill volume of the build material composition 16 that corresponds to a portion of the 3D object model.

It is to be understood that a single fusing agent 26 may be selectively applied on the portion 40, or multiple fusing agents 26 may be selectively applied on the portion 40. As an example, multiple fusing agents 26 may be used to create a multi-colored part. As another example, one fusing agent 26 may be applied to an interior portion of a layer and/or to interior layer(s) of a 3D part, and a second fusing agent 26 may be applied to the exterior portion(s) of the layer and/or to the exterior layer(s) of the 3D part. In the latter example, the color of the second fusing agent 26 will be exhibited at the exterior of the part.

As illustrated in FIG. 2C, the fusing agent 26 may be dispensed from the applicator 24. The applicator 24 may be a thermal inkjet printhead, a piezoelectric printhead, a continuous inkjet printhead, etc., and the selectively applying of the fusing agent 26 may be accomplished by thermal inkjet printing, piezo electric inkjet printing, continuous inkjet printing, etc.

The controller 30 may process data, and in response, control the applicator 24 (e.g., in the directions indicated by the arrow 28) to deposit the fusing agent 26 onto predetermined portion(s) 40 of the build material layer 38 that are to become part of the 3D part. The applicator 24 may be programmed to receive commands from the controller 30 and to deposit the fusing agent 26 according to a pattern of a cross-section for the layer of the 3D part that is to be formed. As used herein, the cross-section of the layer of the 3D part to be formed refers to the cross-section that is parallel to the surface of the build area platform 12. In the example shown in FIG. 2C, the applicator 24 selectively applies the fusing agent 26 on those portion(s) 40 of the build material layer 38 that is/are to become the first layer of the 3D part. As an example, if the 3D part that is to be formed is to be shaped like a cube or cylinder, the fusing agent 26 will be deposited in a square pattern or a circular pattern (from a top view), respectively, on at least a portion of the build material layer 38. In the example shown in FIG. 2C, the fusing agent 26 is deposited on the portion 40 of the build material layer 38 and not on the portions 42.

The volume of the fusing agent 26 that is applied per unit of the build material composition 16 in the patterned portion 40 may be sufficient to absorb and convert enough radiation 44 so that the build material composition 16 in the patterned portion 40 will fuse/coalesce. The volume of the fusing agent 26 that is applied per unit of the build material composition 16 may depend, at least in part, on the radiation absorber used, the radiation absorber loading in the fusing agent 26, and the build material composition 16 used.

Figure 2D:
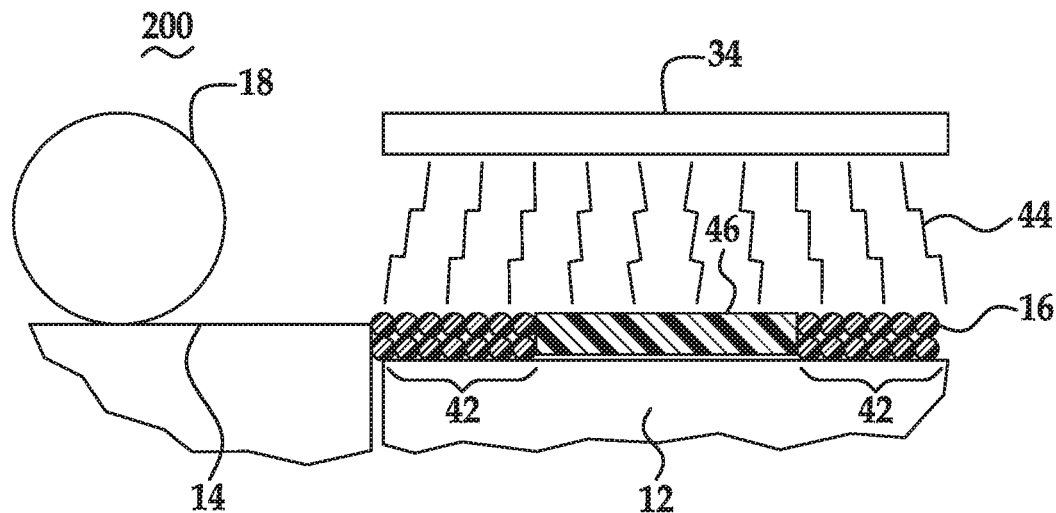

As shown at reference numeral 106 in FIG. 1 and FIGS. 2C and 2D, the method 100, 200 continues by exposing the build material composition 16 to radiation 44 to fuse/coalesce the at least the portion 40 to form a layer 46 of a 3D part. The radiation 44 may be applied with the source 34 of radiation 44 as shown in FIG. 2D or with the source 34' of radiation 44 as shown in FIG. 2C.

The fusing agent 26 enhances the absorption of the radiation 44, converts the absorbed radiation 44 to thermal energy, and promotes the transfer of the thermal heat to the build material composition 16 in contact therewith. In an example, the fusing agent 26 sufficiently elevates the temperature of the build material composition 16 in the layer 38 above the melting or softening point of the particles 16, allowing fusing/coalescing (e.g., thermal merging, melting, binding, etc.) of the build material composition 16 to take place. The application of the radiation 44 forms the fused layer 46, shown in FIG. 2D.

It is to be understood that portions 42 of the build material layer 38 that do not have the fusing agent 26 applied thereto do not absorb enough radiation 44 to fuse/coalesce. As such, these portions 42 do not become part of the 3D part that is ultimately formed. The build material composition 16 in portions 42 may be reclaimed to be reused as build material in the printing of another 3D part.

Figure 2E:
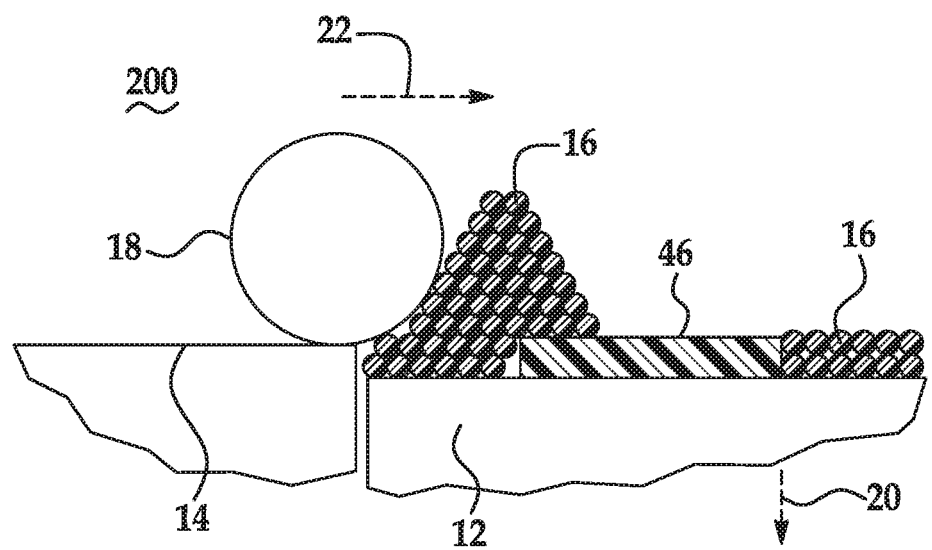

The processes shown in FIG. 1 and FIGS. 2A through 2D may be repeated to iteratively build up several fused layers and to form the 3D printed part. FIG. 2E illustrates the initial formation of a second build material layer on the previously formed layer 46. In FIG. 2E, following the fusing/coalescing of the predetermined portion(s) 40 of the build material composition 16, the controller 30 may process data, and in response cause the build area platform 12 to be moved a relatively small distance in the direction denoted by the arrow 20. In other words, the build area platform 12 may be lowered to enable the next build material layer to be formed. For example, the build material platform 12 may be lowered a distance that is equivalent to the height of the build material layer 38. In addition, following the lowering of the build area platform 12, the controller 30 may control the build material supply 14 to supply additional build material composition 16 (e.g., through operation of an elevator, an auger, or the like) and the build material distributor 18 to form another build material layer on top of the previously formed layer 46 with the additional build material composition 16. The newly formed build material layer may be in some instances pre-heated, patterned with the fusing agent 26, and then exposed to radiation 44 from the source 34, 34' of radiation 44 to form the additional fused layer.

While the precipitating agent has been described herein as precipitating the radiation absorber of the fusing agent 26, the precipitating agent may precipitate other components (e.g., a colorant) of the fusing agent 26 and/or may precipitate the active materials from liquid functional agents other than the fusing agent 26. As an example, the precipitating agent may precipitate a colorant (e.g., a pigment) of a liquid functional agent used to impart a color to the 3D part (or a region of the 3D part). As another example, the precipitating agent may precipitate an active material (e.g., metal nanoparticles) of a liquid functional agent used to modify a physical property of the 3D part (or a region of the 3D part). As such, some examples of the method 100, 200 may include selectively applying a liquid functional agent on the build material composition 16 (e.g., in the build material layer 38). In some of these examples, the precipitating agent may dissolve in the liquid functional agent and cause the active material to precipitate (either through interaction or by altering the pH).

Figure 3:
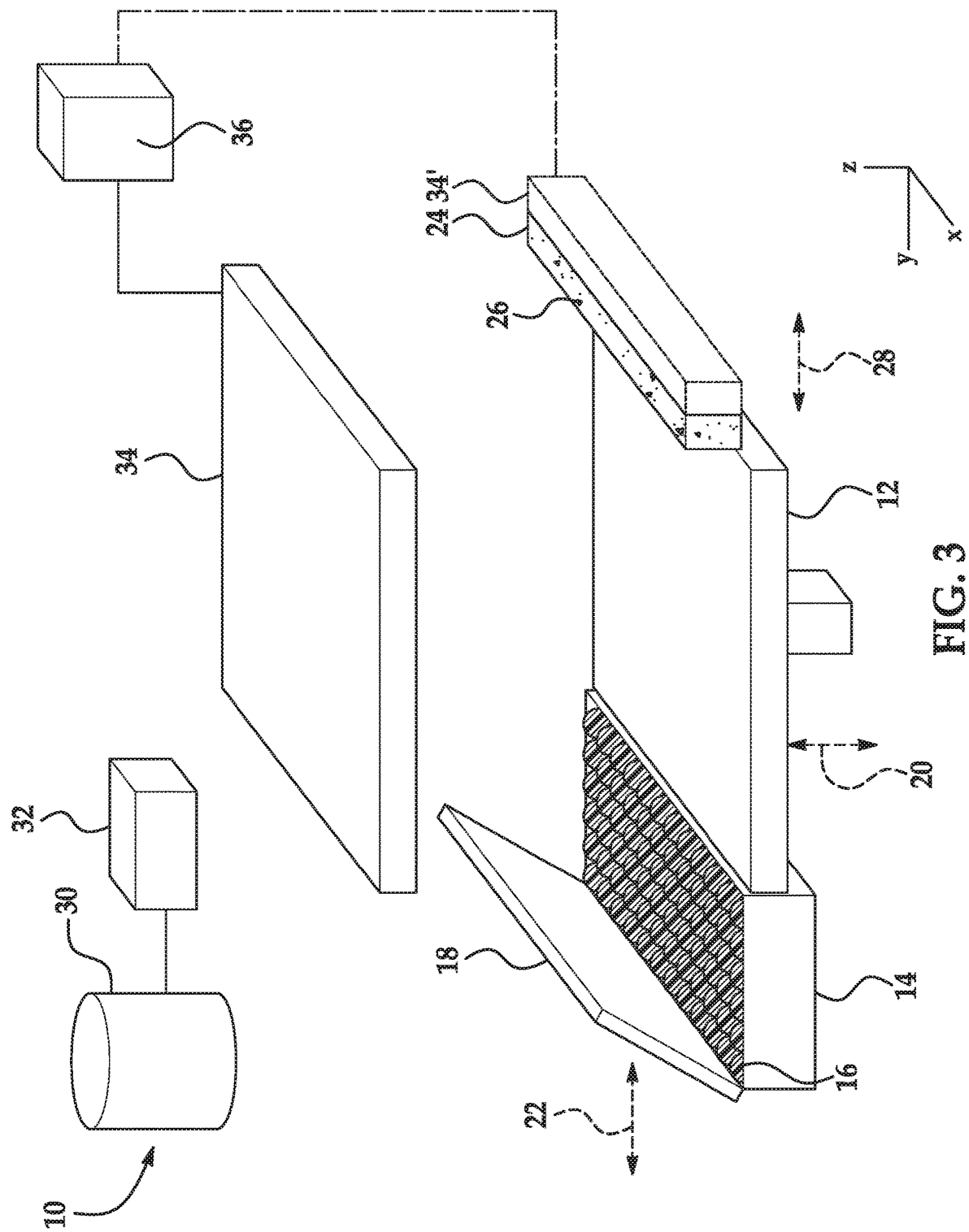
FIG. 3 is a simplified isometric and schematic view of an example of a 3D printing system disclosed herein.

Referring now to FIG. 3, an example of a 3D printing system 10 is schematically depicted. It is to be understood that the 3D printing system 10 may include additional components (some of which are described herein) and that some of the components described herein may be removed and/or modified. Furthermore, components of the 3D printing system 10 depicted in FIG. 3 may not be drawn to scale and thus, the 3D printing system 10 may have a different size and/or configuration other than as shown therein.

In an example, the three-dimensional (3D) printing system 10, comprises: a supply 14 of a build material composition including polymeric or polymeric composite build material; and a precipitating agent; a build material distributor 18; a supply of a fusing agent 26; an applicator 24 for selectively dispensing the fusing agent 26; a source 34, 34' of radiation 44; a controller 30; and a non-transitory computer readable medium having stored thereon computer executable instructions to cause the controller 30 to: utilize the build material distributor 18 to dispense the build material composition 16; utilize the applicator 24 to selectively dispense the fusing agent 26 on at least a portion 40 of the build material composition 16; and utilize the source 34, 34' of radiation 44 to expose the build material composition 16 to radiation 44 to fuse/coalesce the portion 40 of the build material composition 16.

As shown in FIG. 3, the printing system 10 includes the build area platform 12, the build material supply 14 containing the build material composition 16 including the polymeric or polymeric composite build material and the precipitating agent, and the build material distributor 18.

As mentioned above, the build area platform 12 receives the build material composition 16 from the build material supply 14. The build area platform 12 may be integrated with the printing system 10 or may be a component that is separately insertable into the printing system 10. For example, the build area platform 12 may be a module that is available separately from the printing system. The build material platform 12 that is shown is one example, and could be replaced with another support member, such as a platen, a fabrication/print bed, a glass plate, or another build surface.

As also mentioned above, the build material supply 14 may be a container, bed, or other surface that is to position the build material composition 16 between the build material distributor 18 and the build area platform 12. In some examples, the build material supply 14 may include a surface upon which the build material composition 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material composition 16 from a storage location to a position to be spread onto the build area platform 12 or onto a previously formed layer 46 of the 3D part.

As also mentioned above, the build material distributor 18 may be a blade (e.g., a doctor blade), a roller, a combination of a roller and a blade, and/or any other device capable of spreading the build material composition 16 over the build area platform 12 (e.g., a counter-rotating roller).

As shown in FIG. 3, the printing system 10 also includes the applicator 24, which may contain the fusing agent 26. The applicator 24 may be scanned across the build area platform 12 in the directions indicated by the arrow 28, e.g., along the y-axis. The applicator 24 may be, for instance, a thermal inkjet printhead, a piezoelectric printhead, a continuous inkjet printhead, etc., and may extend a width of the build area platform 12. While the applicator 24 is shown in FIG. 3 as a single applicator, it is to be understood that the applicator 24 may include multiple applicators that span the width of the build area platform 12. Additionally, the applicators 24 may be positioned in multiple printbars. The applicator 24 may also be scanned along the x-axis, for instance, in configurations in which the applicator 24 does not span the width of the build area platform 12 to enable the applicator 24 to deposit the fusing agent 26 over a large area of the build material composition 16. The applicator 24 may thus be attached to a moving XY stage or a translational carriage (neither of which is shown) that moves the applicator 24 adjacent to the build area platform 12 in order to deposit the fusing agent 26 in predetermined areas 40 of the build material layer 38 that has been formed on the build area platform 12 in accordance with the method 100, 200 disclosed herein. The applicator 24 may include a plurality of nozzles (not shown) through which the fusing agent 26 is to be ejected.

The applicator 24 may deliver drops of the fusing agent 26 at a resolution ranging from about 300 dots per inch (DPI) to about 1200 DPI. In other examples, the applicator 24 may deliver drops of the fusing agent 26 at a higher or lower resolution. The drop velocity may range from about 5 m/s to about 24 m/s and the firing frequency may range from about 1 kHz to about 100 kHz. In one example, the volume of each drop may be in the order of about 3 picoliters (pl) to about 18 pl, although it is contemplated that a higher or lower drop volume may be used. In some examples, the applicator 24 is able to deliver variable drop volumes of the fusing agent 26. One example of a suitable printhead has 600 DPI resolution and can deliver drop volumes ranging from about 6 pl to about 14 pl.

Each of the previously described physical elements may be operatively connected to a controller 30 of the printing system 10. The controller 30 may process print data that is based on a 3D object model of the 3D object/part to be generated. In response to data processing, the controller 30 may control the operations of the build area platform 12, the build material supply 14, the build material distributor 18, and the applicator 24. As an example, the controller 30 may control actuators (not shown) to control various operations of the 3D printing system 10 components. The controller 30 may be a computing device, a semiconductor-based microprocessor, a central processing unit (CPU), an application specific integrated circuit (ASIC), and/or another hardware device. Although not shown, the controller 30 may be connected to the 3D printing system 10 components via communication lines.

The controller 30 manipulates and transforms data, which may be represented as physical (electronic) quantities within the printer's registers and memories, in order to control the physical elements to create the 3D part. As such, the controller 30 is depicted as being in communication with a data store 32. The data store 32 may include data pertaining to a 3D part to be printed by the 3D printing system 10. The data for the selective delivery of the build material composition 16, the fusing agent 26, etc. may be derived from a model of the 3D part to be formed. For instance, the data may include the locations on each build material layer 38 that the applicator 24 is to deposit the fusing agent 26. In one example, the controller 30 may use the data to control the applicator 24 to selectively apply the fusing agent 26. The data store 32 may also include machine readable instructions (stored on a non-transitory computer readable medium) that are to cause the controller 30 to control the amount of build material composition 16 that is supplied by the build material supply 14, the movement of the build area platform 12, the movement of the build material distributor 18, the movement of the applicator 24, etc.

As shown in FIG. 3, the printing system 10 may also include a source 34, 34' of radiation 44. In some examples, the source 34 of radiation 44 may be in a fixed position with respect to the build material platform 12. The source 34 in the fixed position may be a conductive heater or a radiative heater that is part of the printing system 10. These types of heaters may be placed below the build area platform 12 (e.g., conductive heating from below the platform 12) or may be placed above the build area platform 12 (e.g., radiative heating of the build material layer surface). In other examples, the source 34' of radiation 44 may be positioned to apply radiation 44 to the build material composition 16 immediately after the fusing agent 26 has been applied thereto. In the example shown in FIG. 3, the source 34' of radiation 44 is attached to the side of the applicator 24 which allows for patterning and heating/exposing to radiation 44 in a single pass.

The source 34, 34' of radiation 44 may emit 44 having wavelengths ranging from about 100 nm to about 1 mm. As one example, the radiation 44 may range from about 800 nm to about 2 μm. As another example, the radiation 44 may be blackbody radiation with a maximum intensity at a wavelength of about 1100 nm. The source 34, 34' of radiation 44 may be infrared (IR) or near-infrared light sources, such as IR or near-IR curing lamps, IR or near-IR light emitting diodes (LED), or lasers with the desirable IR or near-IR electromagnetic wavelengths.

The source 34, 34' of radiation 44 may be operatively connected to a lamp/laser driver, an input/output temperature controller, and temperature sensors, which are collectively shown as radiation system components 36. The radiation system components 36 may operate together to control the source 34, 34' of radiation 44. The temperature recipe (e.g., radiation exposure rate) may be submitted to the input/output temperature controller. During heating, the temperature sensors may sense the temperature of the build material 16, and the temperature measurements may be transmitted to the input/output temperature controller. For example, a thermometer associated with the heated area can provide temperature feedback. The input/output temperature controller may adjust the source 34, 34' of radiation 44 power set points based on any difference between the recipe and the real-time measurements. These power set points are sent to the lamp/laser drivers, which transmit appropriate lamp/laser voltages to the source 34, 34' of radiation 44. This is one example of the radiation system components 36, and it is to be understood that other radiation source control systems may be used. For example, the controller 30 may be configured to control the source 34, 34' of radiation 44.

In the examples of the method 100, 200 and the system 10 disclosed herein, and as mentioned above, a fusing agent 26 may be used. Examples of the fusing agent 26 are dispersions including a radiation absorber (i.e., an active material). The active material may be any infrared light absorbing colorant. In an example, the active material is a near-infrared light absorber. Any near-infrared colorants, e.g., those produced by Fabricolor, Eastman Kodak, or Yamamoto, may be used in the fusing agent 26. As one example, the fusing agent 26 may be a printing liquid formulation including carbon black as the active material. Examples of this printing liquid formulation are commercially known as CM997A, 516458, C18928, C93848, C93808, or the like, all of which are available from HP Inc. Other suitable active materials include any radiation absorber that can be precipitated by the precipitating agent disclosed herein, including, for example, near-infrared absorbing dyes or plasmonic resonance absorbers.

As another example, the fusing agent 26 may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

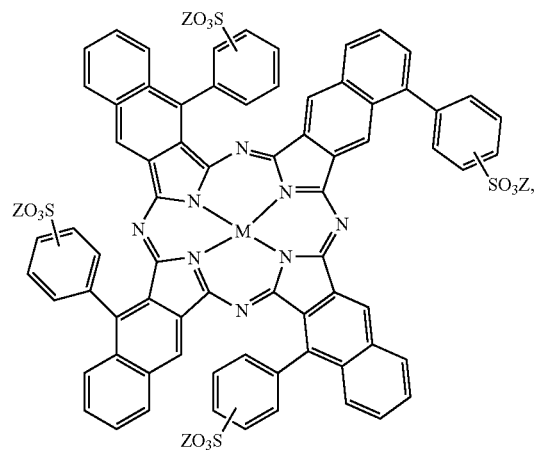

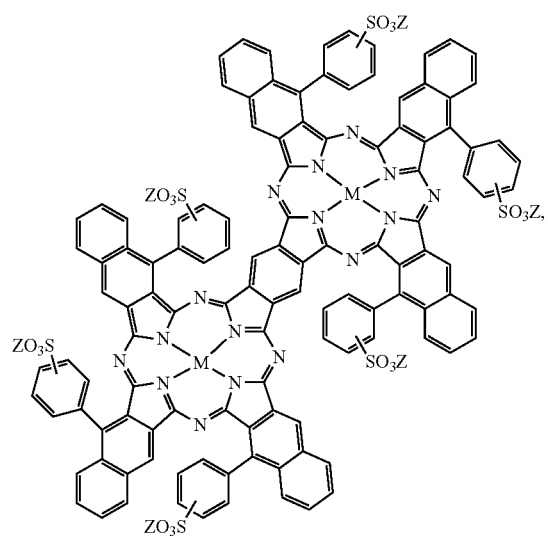

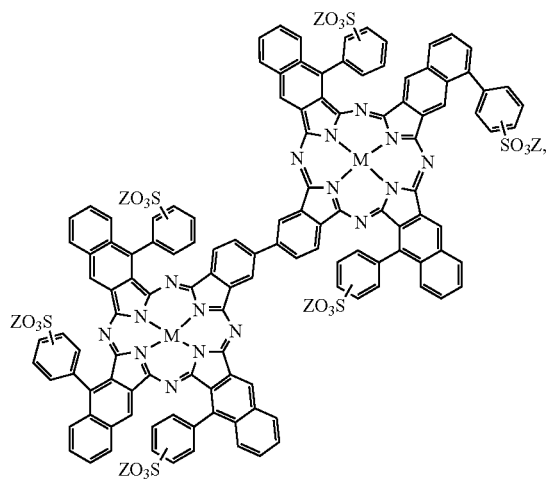

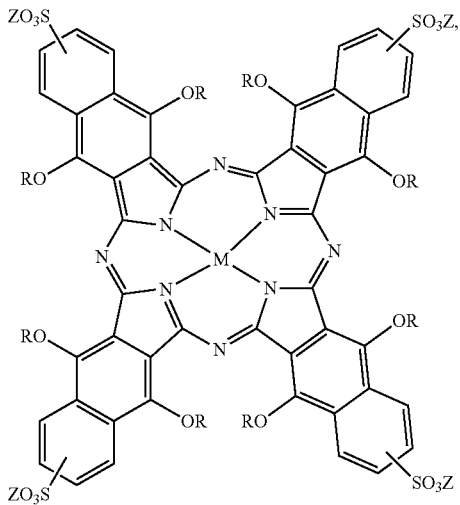

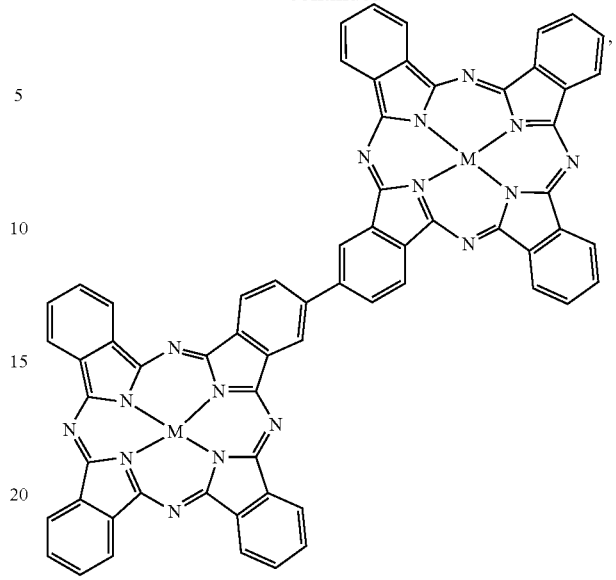

and mixtures thereof. In the above formulations, M can be a divalent metal atom (e.g., copper, etc.) or can have OSO$_3$Na axial groups filling any unfilled valencies if the metal is more than divalent (e.g., indium, etc.), R can be H or any C1-C8 alkyl group (including substituted alkyl and unsubstituted alkyl), and Z can be a counterion such that the overall charge of the near-infrared absorbing dye is neutral. For example, the counterion can be sodium, lithium, potassium, NH$_4^+$, etc.

Some other examples of the near-infrared absorbing dye are hydrophobic near-infrared absorbing dyes selected from the group consisting of:

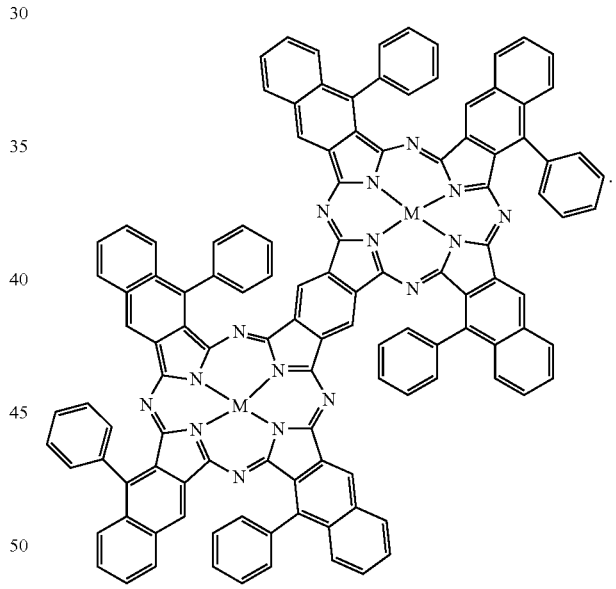

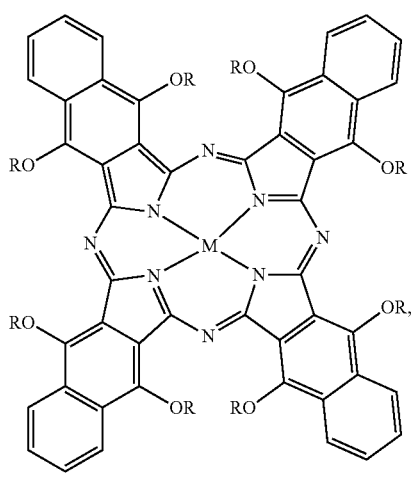

and mixtures thereof. For the hydrophobic near-infrared absorbing dyes, M can be a divalent metal atom (e.g., copper, etc.) or can include a metal that has Cl, Br, or OR' (R'=H, CH$_3$, COCH$_3$, COCH$_2$COOCH$_3$, COCH$_2$COCH$_3$) axial groups filling any unfilled valencies if the metal is more than divalent, and R can be H or any C1-C8 alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal dithiolene dyes or pigments may have the following structures, respectively:

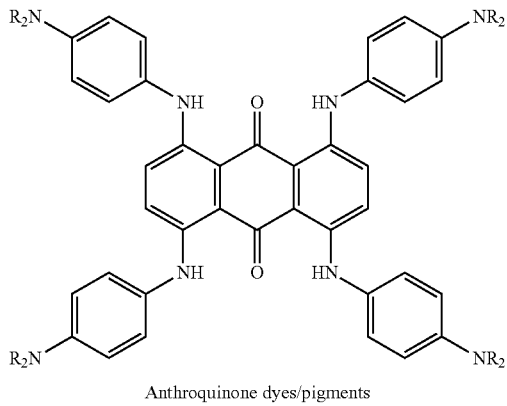
Anthroquinone dyes/pigments

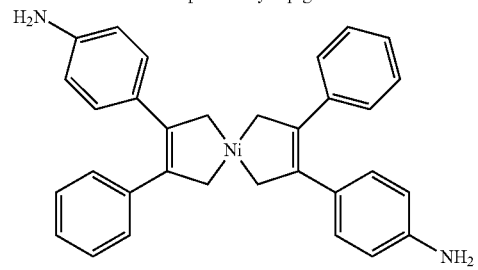
Metal dithiolene dyes/pigments where R in the anthroquinone dyes or pigments may be H or any C1-C8 alkyl group (including substituted alkyl and unsubstituted alkyl).

Cyanine dyes or pigments and perylenediimide dyes or pigments may have the following structures, respectively:

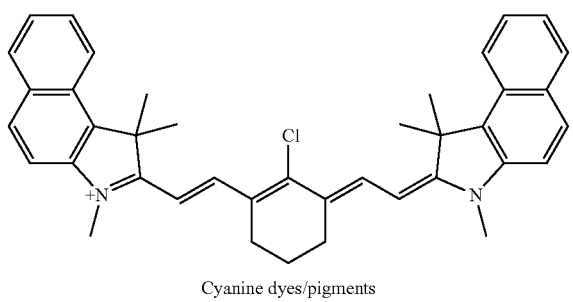
Cyanine dyes/pigments

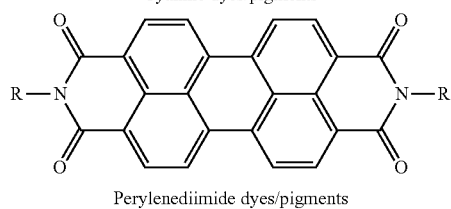
Perylenediimide dyes/pigments where R in the perylenediimide dyes or pigments may be H or any C1-C8 alkyl group (including substituted alkyl and unsubstituted alkyl).

Croconium dyes or pigments and pyrilium or thiopyrilium dyes or pigments may have the following structures, respectively:

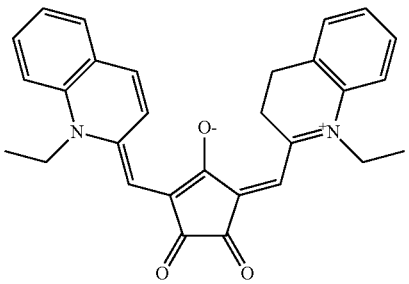
Croconium dyes/pigments

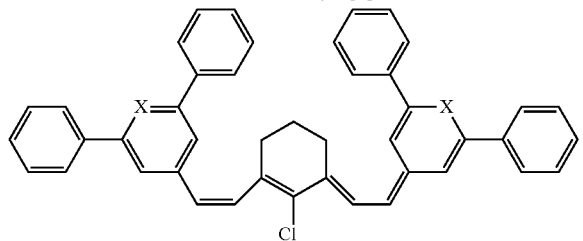
Pyrilium (X = O), thiopyrilium (X = S) dyes/pigments

Boron-dipyrromethene dyes or pigments and aza-boron-dipyrromethene dyes or pigments may have the following structures, respectively:

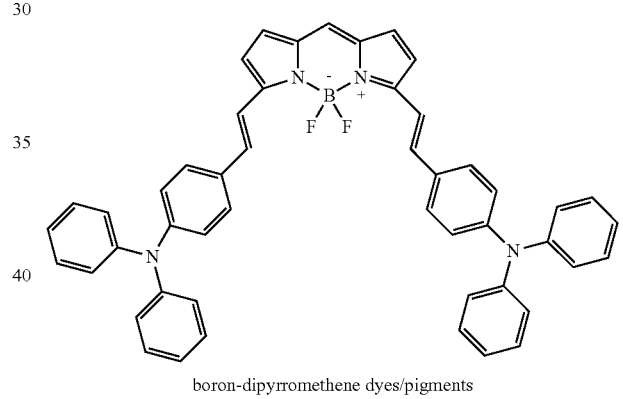
boron-dipyrromethene dyes/pigments

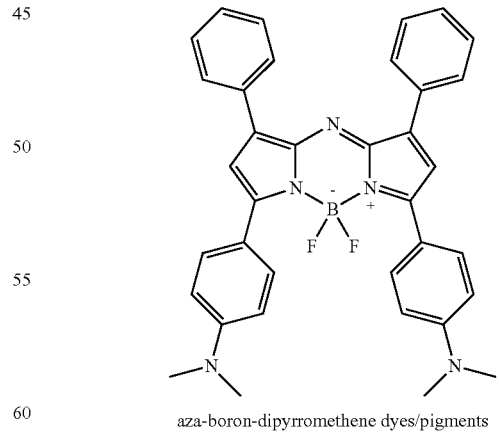
aza-boron-dipyrromethene dyes/pigments

In other examples, the active material may be a plasmonic resonance absorber. The plasmonic resonance absorber allows the fusing agent 26 to absorb radiation at wavelengths ranging from 800 nm to 4000 nm (e.g., at least 80% of radiation having wavelengths ranging from 800 nm to 4000 nm is absorbed), which enables the fusing agent 26 to convert enough radiation to thermal energy so that the build material composition 16 fuses/coalesces. The plasmonic resonance absorber also allows the fusing agent 26 to have transparency at wavelengths ranging from 400 nm to 780 nm (e.g., 20% or less of radiation having wavelengths ranging from 400 nm to 780 nm is absorbed), which enables the 3D part to be white or slightly colored.

The absorption of the plasmonic resonance absorber is the result of the plasmonic resonance effects. Electrons associated with the atoms of the plasmonic resonance absorber may be collectively excited by radiation, which results in collective oscillation of the electrons. The wavelengths that can excite and oscillate these electrons collectively are dependent on the number of electrons present in the plasmonic resonance absorber particles, which in turn is dependent on the size of the plasmonic resonance absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the fusing agent 26 to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter (e.g., volume-weighted mean diameter) ranging from greater than 0 nm to less than 220 nm. In another example the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO_4$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the active material that is present in the fusing agent 26 ranges from greater than 0 wt % to about 40 wt % based on the total weight of the fusing agent 26. In other examples, the amount of the active material in the fusing agent 26 ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the fusing agent 26 having jetting reliability and heat and/or radiation absorbance efficiency.

As used herein, "FA vehicle" may refer to the liquid in which the active material is dispersed or dissolved to form the fusing agent 26. A wide variety of FA vehicles, including aqueous and non-aqueous vehicles, may be used in the fusing agent 26. In some examples, the FA vehicle may include water alone or a non-aqueous solvent alone with no other components. In other examples, the FA vehicle may include other components, depending, in part, upon the applicator 24 that is to be used to dispense the fusing agent 26. Examples of other suitable fusing agent components include dispersant(s), silane coupling agent(s), co-solvent(s), surfactant(s), antimicrobial agent(s), anti-kogation agent(s), and/or chelating agent(s).

When the active material is the plasmonic resonance absorber, the plasmonic resonance absorber may, in some instances, be dispersed with a dispersant. As such, the dispersant helps to uniformly distribute the plasmonic resonance absorber throughout the fusing agent 26. Examples of suitable dispersants include polymer or small molecule dispersants, charged groups attached to the plasmonic resonance absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the fusing agent 26 may range from about 10 wt % to about 200 wt % based on the weight of the plasmonic resonance absorber in the fusing agent 26.

When the active material is the plasmonic resonance absorber, a silane coupling agent may also be added to the fusing agent 26 to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the fusing agent 26 may range from about 0.1 wt % to about 50 wt % based on the weight of the plasmonic resonance absorber in the fusing agent 26. In an example, the total amount of silane coupling agent(s) in the fusing agent 26 ranges from about 1 wt % to about 30 wt % based on the weight of the plasmonic resonance absorber. In another example, the total amount of silane coupling agent(s) in the fusing agent 26 ranges from about 2.5 wt % to about 25 wt % based on the weight of the plasmonic resonance absorber.

The solvent of the fusing agent 26 may be water or a non-aqueous solvent (e.g., ethanol, acetone, n-methyl pyrrolidone, aliphatic hydrocarbons, etc.). In some examples, the fusing agent 26 consists of the active material and the solvent (without other components). In these examples, the solvent makes up the balance of the fusing agent 26.

Classes of organic co-solvents that may be used in a water-based fusing agent 26 include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the fusing agent 26 in a total amount ranging from about 1 wt % to about 50 wt % based upon the total weight of the fusing agent 26, depending upon the jetting architecture of the applicator 24. In an example, the total amount of the co-solvent(s) present in the fusing agent 26 is 25 wt % based on the total weight of the fusing agent 26.

The co-solvent(s) of the fusing agent 26 may depend, in part, upon the jetting technology that is to be used to dispense the fusing agent 26. For example, if thermal inkjet printheads are to be used, water and/or ethanol and/or other longer chain alcohols (e.g., pentanol) may be the solvent (i.e., makes up 35 wt % or more of the fusing agent 26) or co-solvents. For another example, if piezoelectric inkjet printheads are to be used, water may make up from about 25 wt % to about 30 wt % of the fusing agent 26, and the solvent (i.e., 35 wt % or more of the fusing agent 26) may be ethanol, isopropanol, acetone, etc. The co-solvent(s) of the fusing agent 26 may also depend, in part, upon the build material composition 16 that is being used with the fusing agent 26. For a hydrophobic powder (e.g., a polyamide), the vehicle may include a higher solvent content in order to improve the initial flow of the fusing agent 26 into the build material composition 16, where the precipitating agent will interact with the radiation absorber.

The FA vehicle may also include humectant(s). In an example, the total amount of the humectant(s) present in the fusing agent 26 ranges from about 3 wt % to about 10 wt %, based on the total weight of the fusing agent 26. An example of a suitable humectant is LIPONIC® EG-1 (i.e., LEG-1, glycereth-26, ethoxylated glycerol, available from Lipo Chemicals).

In some examples, the FA vehicle includes surfactant(s) to improve the jettability of the fusing agent 26. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants, such as CAPSTONE® FS-35, from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik). In some examples, it may be desirable to utilize a surfactant having a hydrophilic-lipophilic balance (HLB) less than 10.

Whether a single surfactant is used or a combination of surfactants is used, the total amount of surfactant(s) in the fusing agent 26 may range from about 0.01 wt % to about 10 wt % based on the total weight of the fusing agent 26. In an example, the total amount of surfactant(s) in the fusing agent 26 may be about 3 wt % based on the total weight of the fusing agent 26.

An anti-kogation agent may be included in the fusing agent 26 that is to be jetted using thermal inkjet printing. Kogation refers to the deposit of dried printing liquid (e.g., fusing agent 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the fusing agent 26 may range from greater than 0.20 wt % to about 0.65 wt % based on the total weight of the fusing agent 26. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

The FA vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the fusing agent 26 may include a total amount of antimicrobial agents that ranges from about 0.05 wt % to about 1 wt %. In an example, the antimicrobial agent(s) is/are a biocide(s) and is/are present in the fusing agent 26 in an amount of about 0.25 wt % (based on the total weight of the fusing agent 26).

Chelating agents (or sequestering agents) may be included in the FA vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fusing agent 26 may range from greater than 0 wt % to about 2 wt % based on the total weight of the fusing agent 26. In an example, the chelating agent(s) is/are present in the fusing agent 26 in an amount of about 0.04 wt % (based on the total weight of the fusing agent 26).

While the examples disclosed herein utilize the fusing agent 26 that includes the radiation absorber, it is to be understood that some examples of the method may utilize a binder fluid instead of the fusing agent 26. In these examples, the binder fluid may include a binder that can interact with the precipitating agent in the build material 16. The interaction of the binder and precipitating agent causes the binder to precipitate. The precipitated binder solids are contained within voids among the build material particles in the desired fill volume.

With the binder fluid, the method may involve: applying a build material composition (which may include the polymeric or polymeric composite build material 16, a metal build material, or a ceramic build material and the precipitating agent); and selectively applying a binder fluid on the at least the portion 32 of the build material to form a region of a layer of an intermediate part. This method may be repeated to form the entire intermediate part, which can then be exposed to heating to de-bind (which at least substantially removes the binder) and to fuse or sinter the build material to form the part.

More specifically, the method may involve: forming an intermediate part by iteratively applying a build material composition to form individual build material layers, the build material composition including: a build material selected from the group consisting of a polymeric build material, a polymeric composite build material, a metal build material, and a ceramic build material; and a precipitating agent; and based on a 3D object model, selectively applying a binder agent on each of the individual build material layers, the binder agent including a binder dissolved herein, wherein the precipitating agent precipitates the binder; and exposing the intermediate part to heat to form a 3D part.

In this example, any of the previously described polymeric or polymeric composite build materials may be used. Also in this example, metal build material may be used, such as steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10Mg, 2xxx series aluminum, 4xxx series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 316L, Ti6Al4V, and Ti-6Al-4V ELI7. While several example alloys have been provided, it is to be understood that other alloys may be used. Moreover, in this example, ceramic build material may be used. Examples of suitable ceramic particles include metal oxides, inorganic glasses, carbides, nitrides, and borides. Some specific examples include alumina ($Al_2O_3$), glass, $Na_2O/CaO/SiO_2$ glass (soda-lime glass), borosilicate glass, alumina silica glass, silicon mononitride (SiN), silicon dioxide ($SiO_2$), zirconia ($ZrO_2$), titanium dioxide ($TiO_2$), $MgAl_2O_4$, tin oxide, yttrium oxide, hafnium oxide, tantalum oxide, scandium oxide, niobium oxide, vanadium oxide, or combinations thereof. As an example of one suitable combination, 30 wt % glass may be mixed with 70 wt % alumina. The ceramic build material may have a melting point ranging from about 1000° C. to about 4000° C. As an example, the ceramic build material may be a metal oxide having a melting point ranging from about 1000° C. to about 2800° C.

Any of the previously described precipitating agents may be used in the build material composition that is to be patterned with the binder agent.

In this example, the binder agent may be any liquid that contains a binder that is capable of dissolving in the liquid and that can be precipitated by the precipitating agent in the build material 16. The binder is also capable of temporarily adhering or binding the patterned build material particles together, once precipitated out of solution. In these examples, the binder may be polyethylene oxide, polyethylene glycol, polyvinyl alcohol, polyvinylbutyral, or the like. The binder may be present in the binder agent in an amount ranging from about 20 wt % to about 45 wt %.

An example of the binder agent includes water, a cosolvent, the binder, and an additive selected from the group consisting of a surfactant, a biocide, etc. Any of the previously described co-solvents, surfactants, and biocides may be used, in similar amounts except that the total amount would be with respect to the binder agent.

To further illustrate the present disclosure, an example is given herein. It is to be understood that this example is provided for illustrative purposes and is not to be construed as limiting the scope of the present disclosure.

EXAMPLE

Three examples of the build material composition were prepared, and one comparative build material composition was prepared. The example polymeric build material used in each of the example build material compositions and the comparative build material composition was a thermoplastic polyurethane powder, with talcum powder as a flow aid included in an amount ranging from greater than or equal to 0.1 wt % to less than 0.2 wt % (based on the total weight of the example polymeric build material). The example precipitating agent used in each of the example build material compositions was micronized calcium chloride ($CaCl_2$). The comparative build material composition did not include a precipitating agent. The first example build material composition included about 0.1 wt % of the calcium chloride (based on the total weight of the example build material composition). The second example build material composition included about 1 wt % of the calcium chloride (based on the total weight of the example build material composition), and the third example build material composition included about 10 wt % of the calcium chloride (based on the total weight of the example build material composition).

Four layers, each with a thickness of 0.8 mm (i.e., 800 µm), were formed with the example build material compositions and the comparative build material composition (i.e., each build material composition was used to form one layer). Then, an example fusing agent, including carbon black pigment as the radiation absorber, was applied on each layer.

The horizontal penetration length of the carbon black pigment (i.e., the horizontal distance that the carbon black pigment migrated from where the fusing agent was applied) was measured for each layer. The horizontal penetration length of the carbon black pigment in the layer of the comparative build material composition was about 10 mm.

The horizontal penetration length of the carbon black pigment in the layer of the first example build material composition was about 5.4 mm. The horizontal penetration length of the carbon black pigment in the layer of the second example build material composition was about 2.3 mm, and the horizontal penetration length of the carbon black pigment in the layer of the third example build material composition was 0 mm. In each layer formed with one of the example build material compositions, the flow of the vehicle of the fusing agent extended past the horizontal penetration length of the carbon black pigment. This illustrates that while the vehicle may continue to migrate, the migration of the carbon black pigment was stopped.

Figure 4:
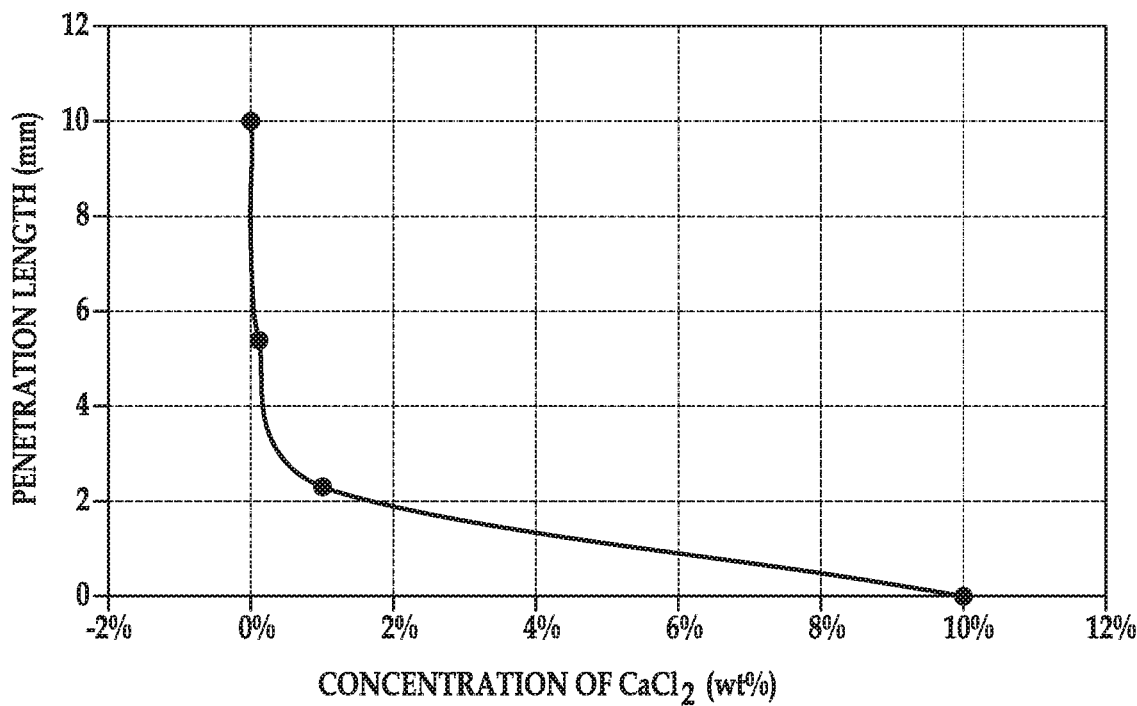
FIG. 4 is a graph of the horizontal penetration length of carbon black pigment as a function of the concentration of calcium chloride in the build material compositions, with the horizontal penetration length (in mm) shown on the y-axis and the concentrations of calcium chloride (in wt %) shown on the x-axis.

FIG. 4 shows a graph of the horizontal penetration lengths of the carbon black pigment as a function of the amount of calcium chloride in the build material compositions. In FIG. 4, the horizontal penetration lengths (in mm) are shown on the y-axis and the concentrations of calcium chloride in the build material compositions (in wt %) are shown on the x-axis. As shown in FIG. 4, increasing the concentration of calcium chloride (i.e., the precipitating agent) results in less penetration of the carbon black pigment (i.e., the radiation absorber). FIG. 4 also indicates that a concentration of calcium chloride ranging from about 0.2 wt % to about 0.5 wt %, near the inflection point of the curve, may provide good localization of the carbon black pigment with a minimum amount of calcium chloride.

Figure 5:
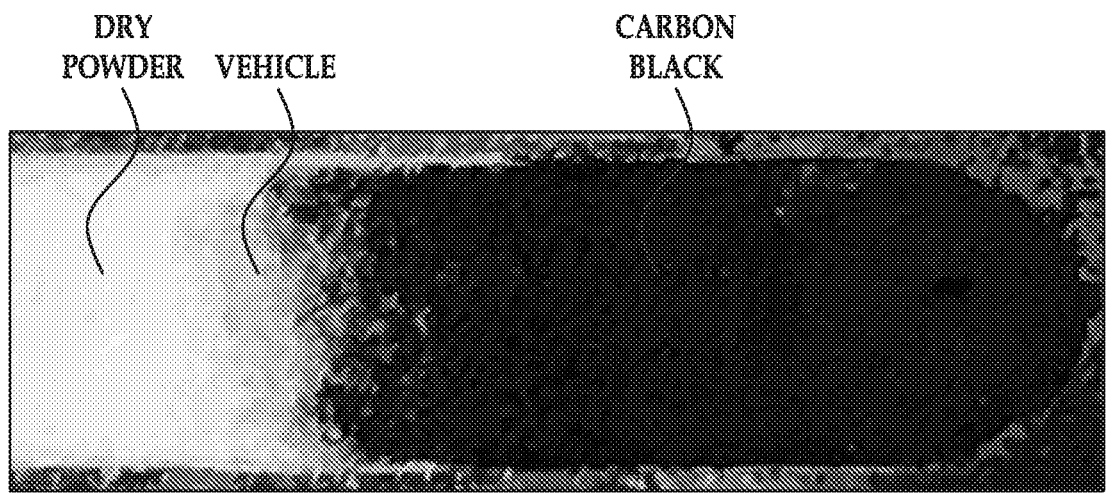
FIG. 5 is a five times magnified, black and white version of an originally colored photograph showing a layer of an example of a build material composition disclosed herein with a fusing agent applied thereon.

Another layer was formed with the first example build material composition, and an example fusing agent, including carbon black pigment as the radiation absorber and from about 0.005 wt % to about 1.0 wt % of fluorescein, was applied on thereon. The fluorescein improved the visualization of the flow of the vehicle of the fusing agent, which extended past the horizontal penetration length of the carbon black pigment. FIG. 5 shows, at a five times magnification, this other layer of the first example build material composition with the fusing agent applied thereon. As shown in FIG. 5, the vehicle flow (labeled as vehicle in FIG. 5) extended past the horizontal penetration length of the carbon black pigment (labeled as carbon black in FIG. 5). FIG. 5 also shows an area of the dry powder of the first example build material composition (labeled as dry powder in FIG. 5) that neither the vehicle nor the carbon black pigment had penetrated.

The results in the Example indicate that the degree of penetration of a radiation absorber may be controlled by the amount of the precipitating agent included in the build material composition.

It is to be understood that the ranges provided herein include the stated range and any value or sub-range within the stated range. For example, from about 0.25 wt % to about 20 wt % should be interpreted to include not only the explicitly recited limits of from about 0.25 wt % to about 20 wt %, but also to include individual values, such as about 0.5 wt %, about 1.5 wt %, about 2 wt %, about 5.75 wt %, about 12.7 wt %, about 15 wt %, about 18.2 wt %, etc., and sub-ranges, such as from about 1.4 wt % to about 8 wt %, from about 1.5 wt % to about 17 wt %, from about 0.5 wt % to about 10 wt %, from about 3 wt % to about 5 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for three-dimensional (3D) printing, comprising:
    applying a build material composition to form a build material layer, the build material composition including:
        a polymeric or polymeric composite build material; and
        a precipitating agent selected from the group consisting of a water-soluble mono-valent metallic salt, a water-soluble multi-valent metallic salt, an organic acid, an organic salt, and a combination thereof;
    based on a 3D object model, selectively applying a fusing agent on at least a portion of the build material composition, the fusing agent including a radiation absorber, wherein the precipitating agent precipitates the radiation absorber; and
    exposing the build material composition to radiation to fuse the at least the portion of the build material composition to form a layer of a 3D part.

2. The method as defined in claim 1 wherein the precipitating agent dissolves in a liquid component of the fusing agent prior to precipitating the radiation absorber.

3. The method as defined in claim 1 wherein the precipitating agent prevents the radiation absorber from penetrating beyond a fill volume of the build material composition that corresponds to a portion of the 3D object model.

4. The method as defined in claim 1 wherein the precipitating agent is disposed on surfaces of the polymeric or polymeric composite build material, disposed in voids between the polymeric or polymeric composite build material, or a combination thereof.

5. The method as defined in claim 1 wherein the precipitating agent includes the organic acid, and the precipitating agent is present in the build material composition in an amount ranging from about 0.25 wt % to about 20 wt %, based on a total weight of the build material composition.

6. The method as defined in claim 1 wherein the precipitating agent includes the organic salt, and the precipitating agent is present in the build material composition in an amount ranging from about 0.25 wt % to about 20 wt %, based on a total weight of the build material composition.

7. The method as defined in claim 1 wherein the precipitating agent includes the water-soluble mono-valent metallic salt or the water-soluble multi-valent metallic salt, and the precipitating agent is present in the build material composition in an amount ranging from greater than 0 wt % to about 10 wt %, based on a total weight of the build material composition.

8. The method as defined in claim 1 wherein the precipitating agent includes the water-soluble mono-valent metallic salt or the water-soluble multi-valent metallic salt or the organic salt, and the build material composition further comprises an additive selected from the group consisting of a guanidine compound, an alkenyl succinic anhydride, an alkyl ketene dimer, a nitrogen containing compound, and a combination thereof.

9. The method as defined in claim 8 wherein the additive is present in the build material composition in an amount ranging from about 0.05 wt % to about 0.7 wt %, based on a total weight of the build material composition.

10. A method for three-dimensional (3D) printing, comprising:
  applying a build material composition to form a build material layer, the build material composition including:
    a polymeric or polymeric composite build material; and
    a precipitating agent having an average particle size ranging from about 10 nm to about 50 µm;
  based on a 3D object model, selectively applying a fusing agent on at least a portion of the build material composition, the fusing agent including a radiation absorber, wherein the precipitating agent precipitates the radiation absorber; and
  exposing the build material composition to radiation to fuse the at least the portion of the build material composition to form a layer of a 3D part.

11. The method as defined in claim 10 wherein the precipitating agent dissolves in a liquid component of the fusing agent prior to precipitating the radiation absorber.

12. The method as defined in claim 10 wherein the precipitating agent prevents the radiation absorber from penetrating beyond a fill volume of the build material composition that corresponds to a portion of the 3D object model.

13. The method as defined in claim 10 wherein the precipitating agent is selected from the group consisting of a water-soluble mono-valent metallic salt, a water-soluble multi-valent metallic salt, an organic acid, an organic salt, and a combination thereof.

14. The method as defined in claim 13 wherein the precipitating agent includes the water-soluble mono-valent metallic salt or the water-soluble multi-valent metallic salt or the organic salt, and the build material composition further comprises an additive selected from the group consisting of a guanidine compound, an alkenyl succinic anhydride, an alkyl ketene dimer, a nitrogen containing compound, and a combination thereof.

15. The method as defined in claim 14 wherein the additive is present in the build material composition in an amount ranging from about 0.05 wt % to about 0.7 wt %, based on a total weight of the build material composition.

* * * * *